Wesley D. Cawley
INVENTOR.

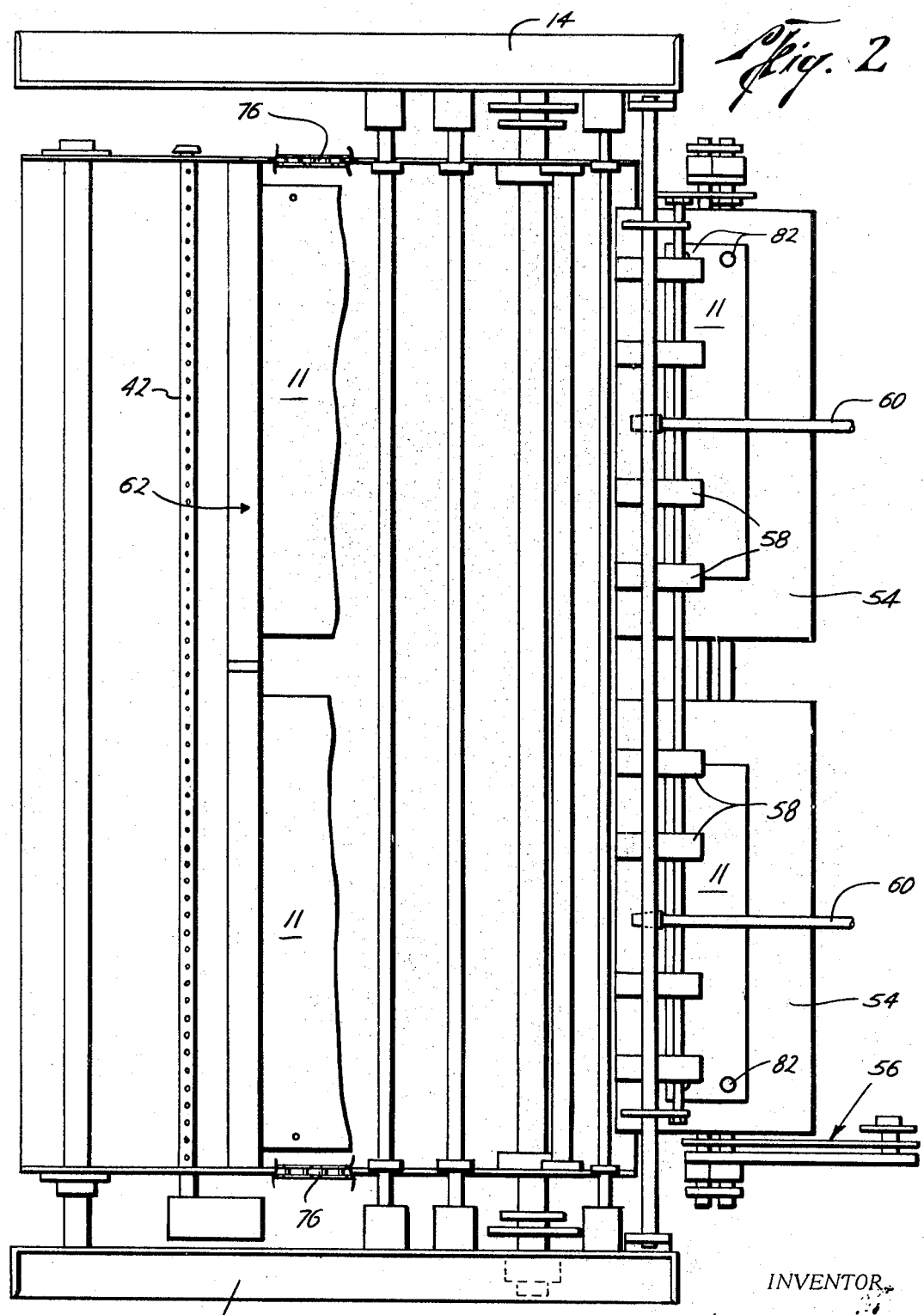

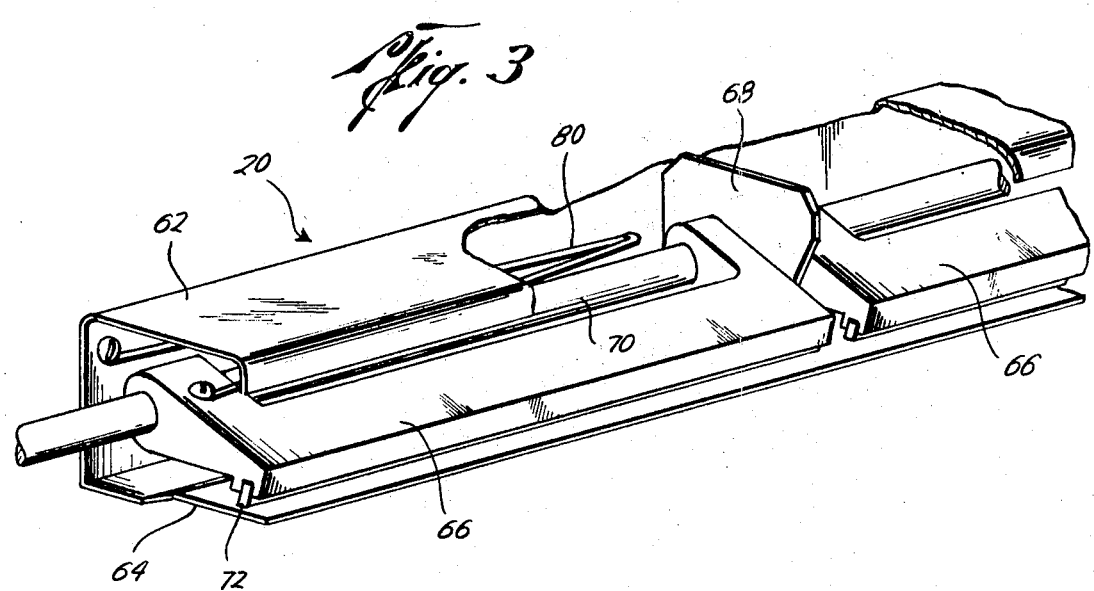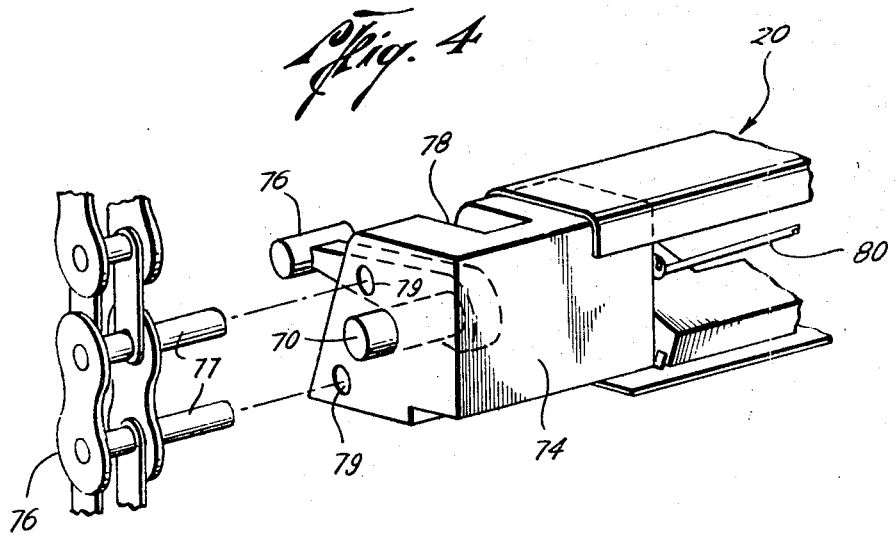

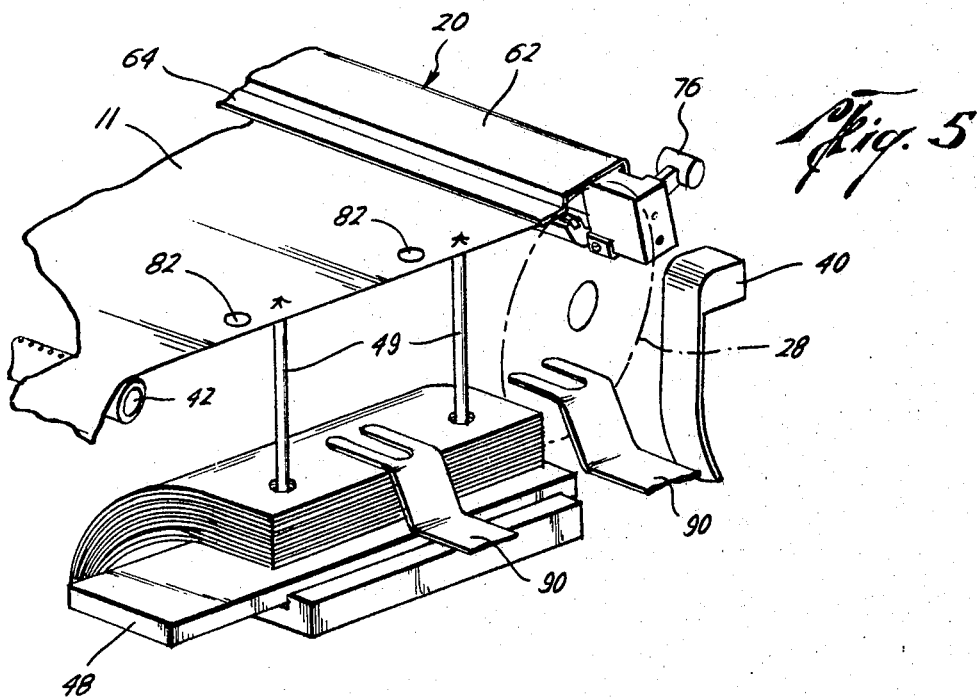
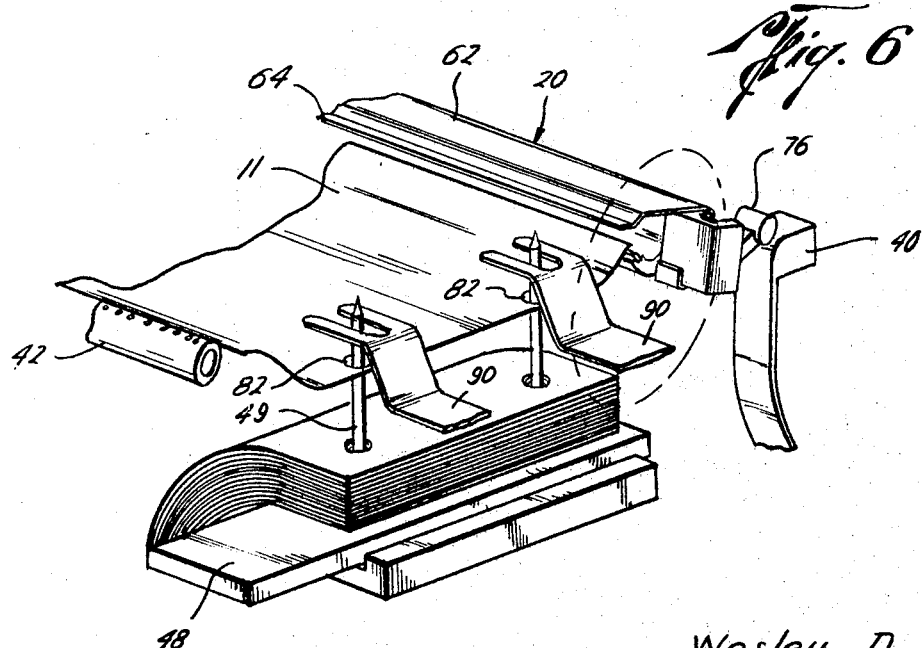

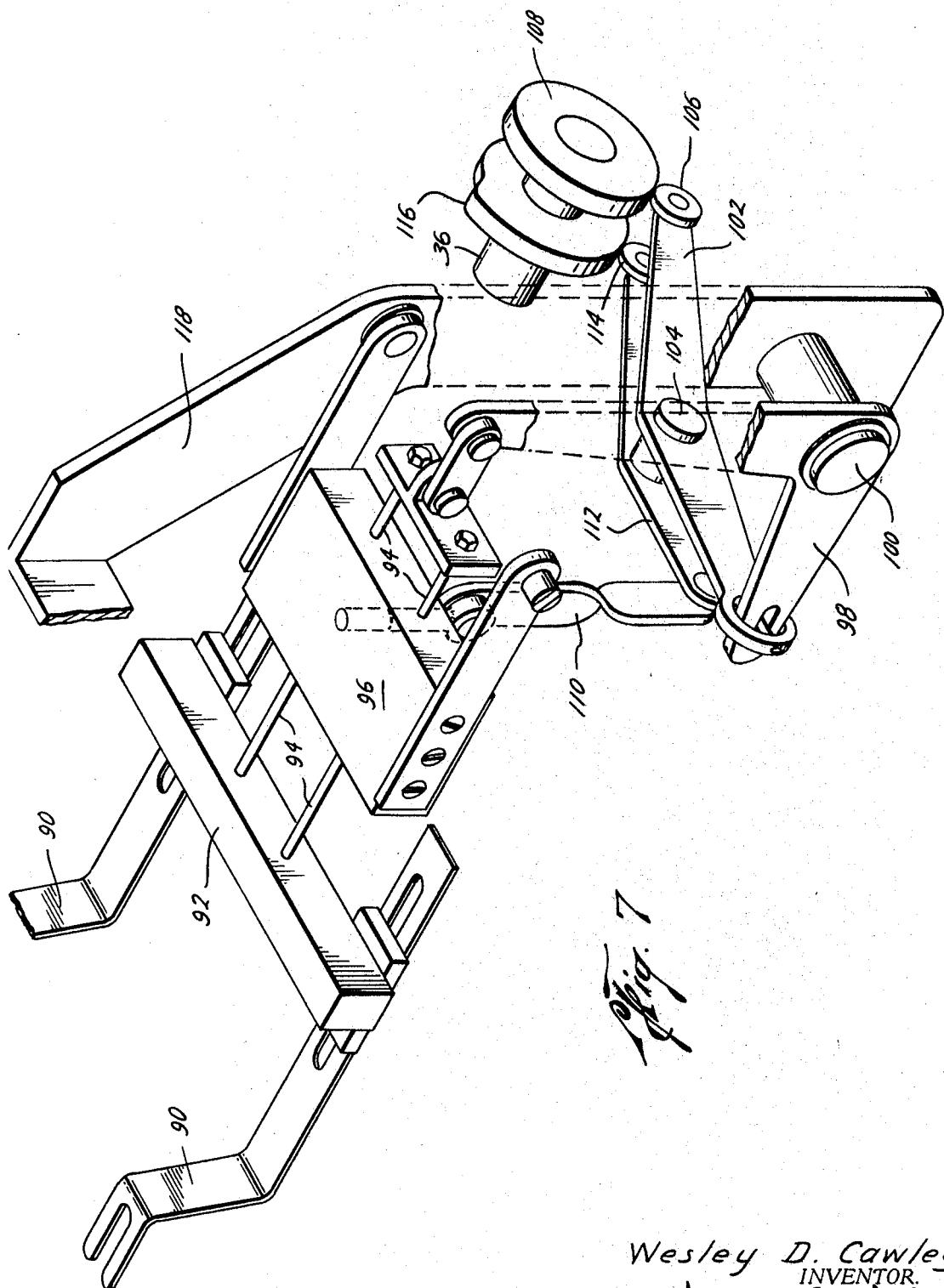

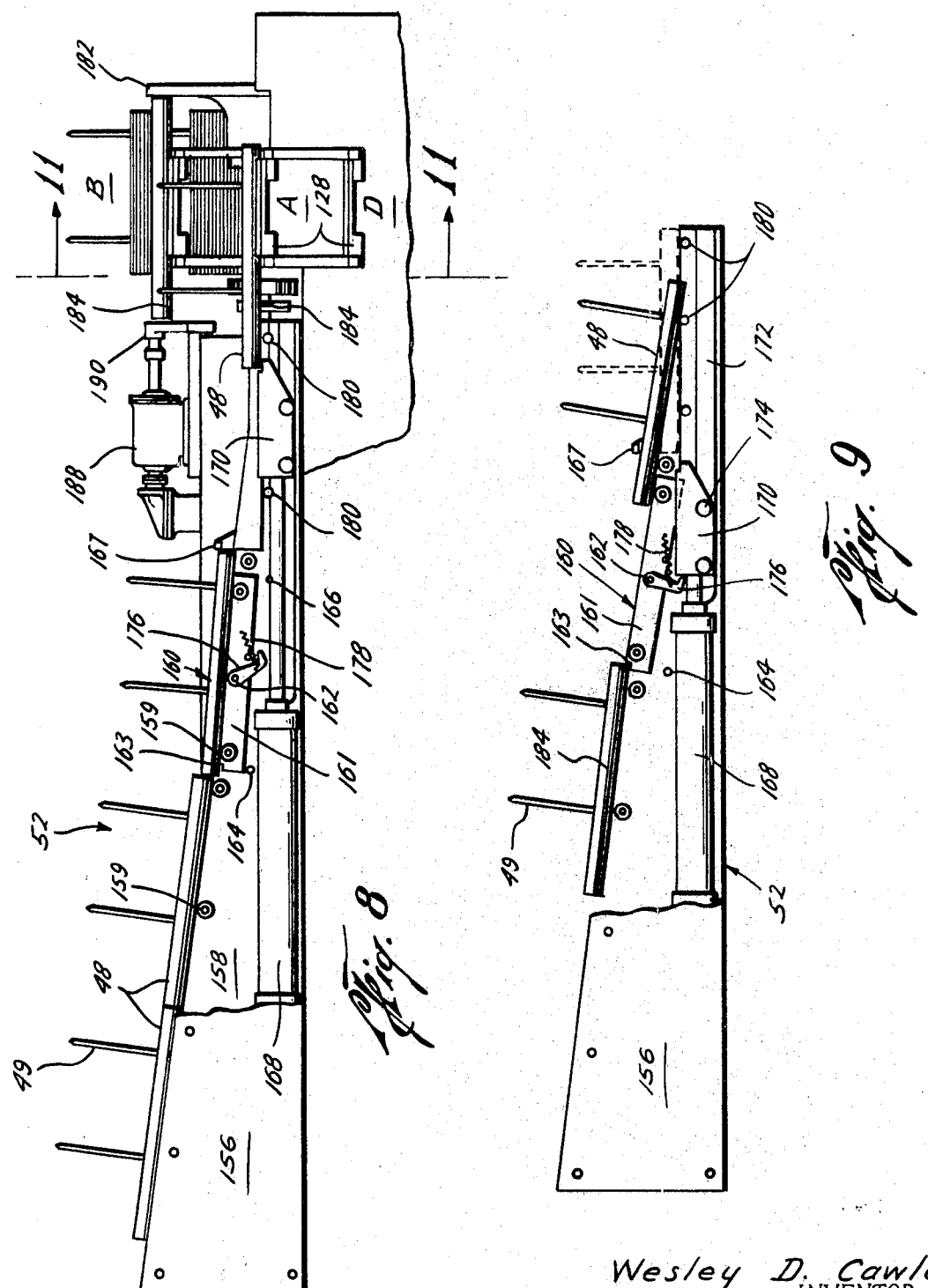

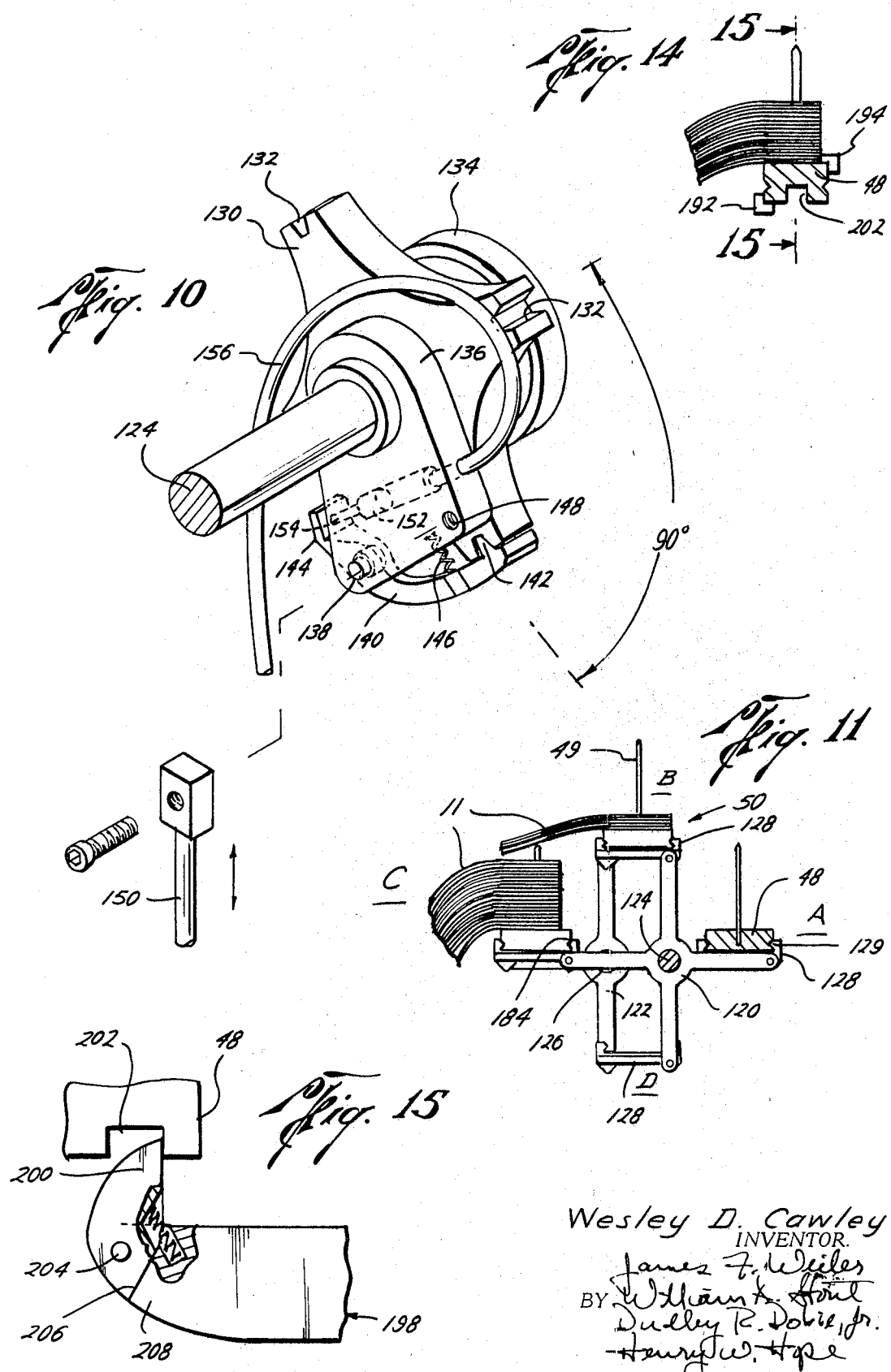

Aug. 11, 1970     W. D. CAWLEY     3,523,686
METHOD AND APPARATUS FOR STACKING SHEET MATERIAL
Filed Sept. 18, 1967     8 Sheets-Sheet 8
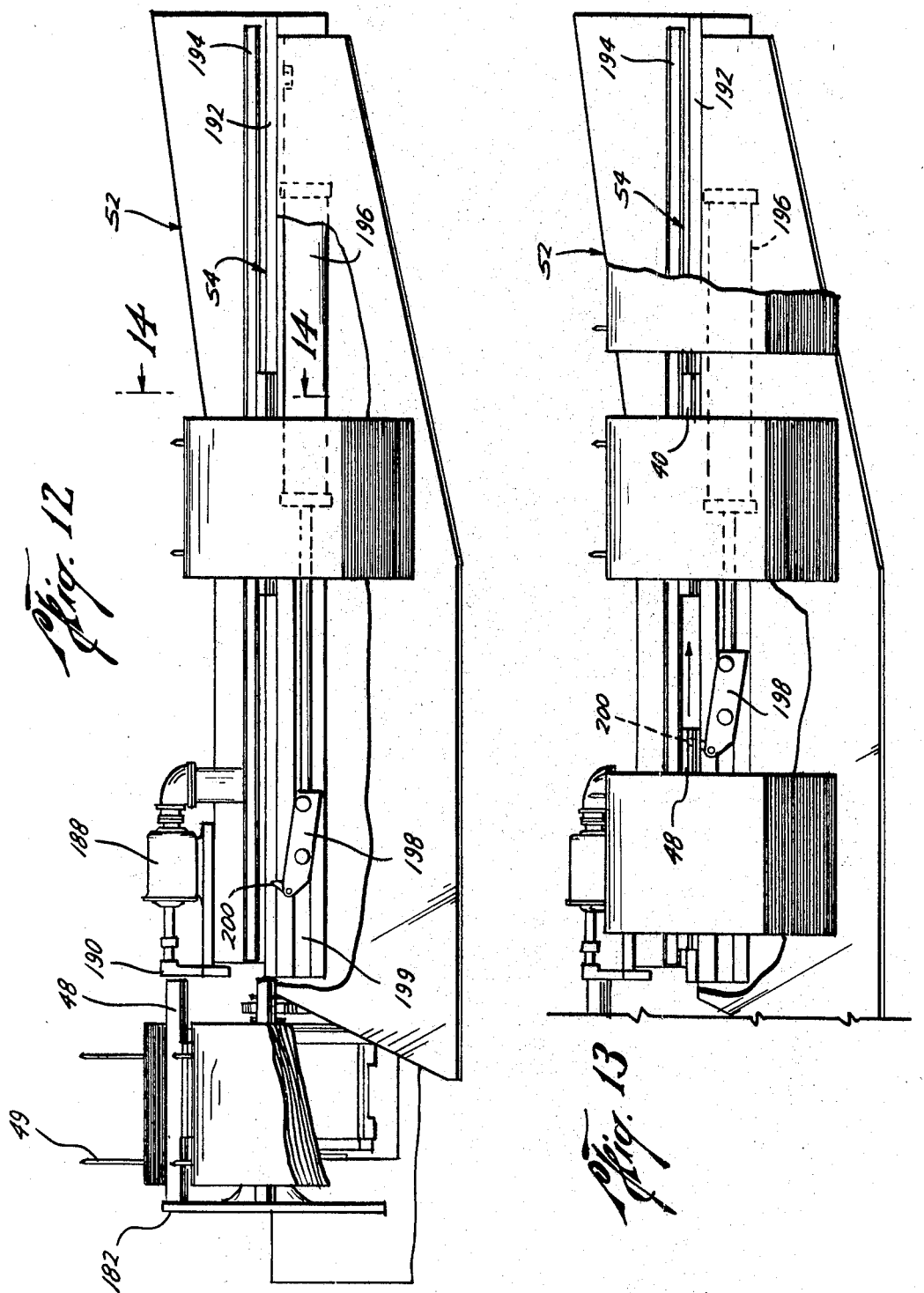
Wesley D. Cawley
INVENTOR.
BY James F. Weiler
William A. Hout
Dudley R. Dobie, Jr.
Henry W. Hope
ATTORNEYS

United States Patent Office 3,523,686
Patented Aug. 11, 1970

3,523,686
**METHOD AND APPARATUS FOR
STACKING SHEET MATERIAL**
Wesley D. Cawley, 721 Ave. A,
Port Neches, Tex. 77651
Filed Sept. 18, 1967, Ser. No. 668,412
Int. Cl. B65h 29/28, 29/68
U.S. Cl. 271—68    8 Claims

ABSTRACT OF THE DISCLOSURE

The present invention is directed to apparatus used to automatically stack sheet material on supports for ease of handling. Endless conveyers are utilized to carry spring loaded, cam operated gripper jaws at a constant speed. At pick-up and release stations, the conveyers move about sprockets, whereby their speed is slowed to allow the proper pick up or release of the sheet material. A novel indexing means is used to position the supports at the receiving station and to remove loaded supports, whereby the movement of the conveyers need not be stopped or slowed. Vacuum means are positioned adjacent the release station for stretching the sheet material to a horizontal position for stacking, and fingers are employed to urge the material onto the stacking supports. The indexing means includes the indexing turret, rotation means and tracks for loading and unloading the supports.

BACKGROUND OF THE INVENTION

The present invention is directed to the field of handling and stacking sheet material, and more particularly, to the stacking of flexible sheet material, for example, plastic bags.

Prior art devices usually accomplished the transfer and stacking of sheet material by the use of apparatus having intermittent motion. The conveying means would halt temporarily to pick up or release the material being conveyed. As can be easily imagined, this would result in a substantial amount of loss of time, especially in high speed operations. In addition, the frequent high speed stops and starts would require additional equipment, when compared with a continuously moving conveying system, and would cause increased wear and tear on the apparatus.

Another prior art method utilizes a second piece of equipment which moves in a path parallel to the conveyer at least a portion of the time. This second piece of equipment could be another endless belt, or it could be simply a work station having a reciprocal motion within fixed limits. This once again requires additional, sometimes complex and expensive equipment. Furthermore, it often presents difficulties in timing.

Additional problems are encountered due to the fact that, in stacking flexible sheet material, it is practically essential to use stacking guides and supports to receive the material for further handling. Prior art devices have to stop the process to remove filled supports and supply empty ones at the stacking station. Further problems are found in the manufacturing of workable supports with upstanding guides.

SUMMARY OF THE INVENTION

The present invention is directed to improved method and apparatus for stacking sheet material and particularly flexible sheet material.

An endless conveyer is used to carry laterally offset gripping jaws about a predetermined path of travel. At least two work stations are located in this path of travel, one being a pick-up station and the other a releasing or stacking station. The path of travel has an arc of a predetermined radius adjacent each of these stations, whereby the laterally offset jaws will be slowed down while the chain continues to move at its constant speed. This enables a more accurate picking up and stacking of the sheet material. The normally closed gripper jaws are cam actuated to open and close at the stations for receiving and releasing the material. Vacuum means adjacent the stacking station holds back the trailing edge of the sheet material so that it may be stacked properly. The vacuum means cooperates with the arc in the path of travel adjacent the stacking station to, in effect, snag locating openings in the sheet material over upstanding stacking guides.

The present invention further employs a unique indexing turret and related apparatus to supply empty stacking supports having thereon the upstanding stacking guides, to the receiving station and to remove filled ones without requiring a stop in the operation. Cam actuated fingers operate at the stacking station to press the material down onto the support as it is released by another cam which opens the gripper jaws.

The indexing turret has a station for receiving and one for discharging the stacking supports. The present invention employs at these stations tracks or guides having means to move the supports onto or off of the turret, as the case may be.

It is, therefore, an object of the present invention to provide improved method and apparatus for the handling and stacking of flexible sheet material.

A further object of the present invention is to provide such improved apparatus which utilizes a continuously moving endless conveyer and requiring no stopping of this movement for stacking purposes or for indexing the stacking supports.

A still further object is to provide such a continuously moving conveyor having a means or method for slowing the speed of the jaws relative to the speed of the conveyer.

A further object is to provide indexing apparatus to quickly and simply index supports without interruption of the operation.

Another object of the present invention is to provide such indexing means having stations for receiving and discharging supports and for receiving the material to be stacked, and including a feed track and a removal track.

Another object is to provide such indexing means utilizing two sets of arms rotatable about different, but parallel axes, whereby the stacking supports remain upright at all times.

A further object is to provide such stacking apparatus having at its stacking station cooperating vacuum means, means to slow the speed of the jaws, reciprocating stacking fingers and upright stacking guides.

An additional object is to provide track means to feed the supports to and remove supports from the indexing turret.

A further object of the present invention is to provide such stacking apparatus which is simple and economical to manufacture, which functions in a dependable manner and which provides for ease and simplicity of operation.

Other and further objects, features and advantages will be apparent from the following description of a presently preferred embodiment of the invention given for the purpose of disclosure and taken in conjuncture with the accompanying drawings.

BRIEF DESCRIPTION OF THE DRAWINGS

In the drawings, like character references designate like parts throughout the several views which are as follows:

FIG. 2 is a top view of the apparatus of FIG. 1 and taken along lines 2—2 of FIG. 1, parts of the machine not being shown for clarity, FIG. 3 is a perspective view, partially in section, of the gripping jaws utilized in the present invention, FIG. 4 is a perspective view of the gripping jaws of FIG. 3 and showing the actuating cam follower and connecting means, the jaws being only partially shown, FIG. 5 is a partial perspective view of the stacking station of the present invention, FIG. 6 is a partial perspective view of the stacking station at FIG. 5 at a different stage of the operation, FIG. 7 is a partial perspective view of the support and actuating means for the reciprocating fingers, FIG. 8 is a side view, partially in section, of the indexing turret and its feeding track, FIG. 9 is a side view, partially in section of the feeding track of FIG. 8, showing a pin support being positioned for feeding to the indexing turret, FIG. 10 is a partial perspective view of the actuating means for the indexing turret, FIG. 11 is an end view of the indexing turret, FIG. 12 is a side view, partially in section, of the indexing turret and the track used to remove filled pin supports from the turret, FIG. 13 is a side view, partially in section, of the track shown in FIG. 12, FIG. 14 is an end view, in section, of the removal track and a pin holder taken along section lines 14—14 of FIG. 12, and FIG. 15 is a sde view of a pin holder, taken along section lines 15—15 of FIG. 14, and showing a portion of the means for removing the pin holders.

DESCRIPTION OF THE PREFERRED EMBODIMENT

Figure 1:
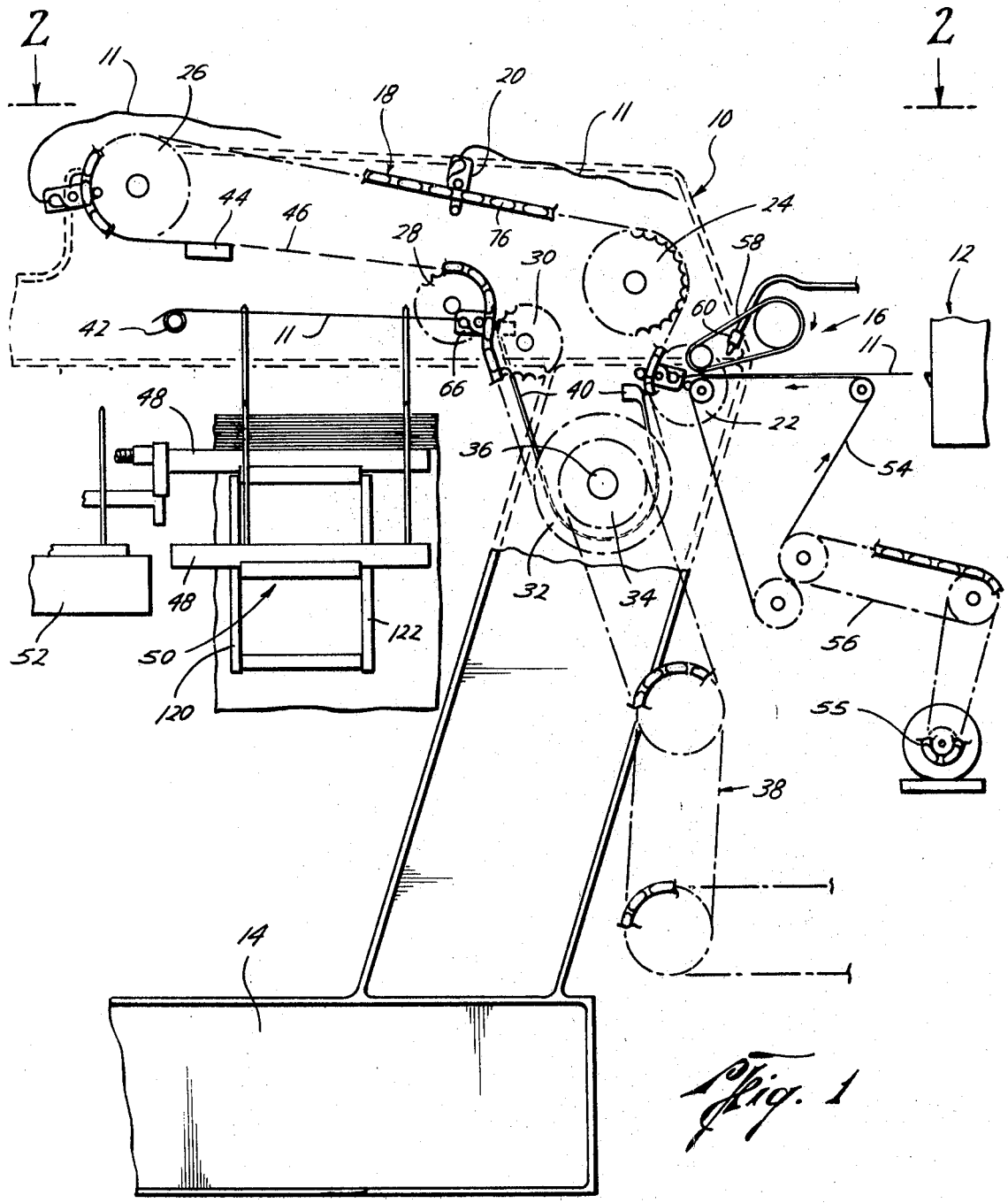
FIG. 1 is a side, partial schematic view of the preferred embodiment of the present invention.

Although the present invention may be used to stack a variety of materials, one particular application is that of plastic bags, such as used in packaging loaves of bread. For purposes of description, therefore, the embodiment described herein will be described as utilized for the stacking of such bags.

Turning now to FIG. 1, a general overall view of the device is shown, and is generally indicated by the numeral 10. The parent machine which makes the bags is indicated by the numeral 12. As will be understood, the apparatus shown in FIG. 1 is only partially shown for purposes of simplicity.

The bag stacking machine is comprised generally of a supporting frame 14 which consists essentially of a supporting member located on each side of the machine. Feeding apparatus 16 is located between the bag stacking machine 10 and the bag forming machine 12 and defines what shall hereinafter be known as the "pick-up" or "feeding station." An endless conveyor generally indicated at 18 with gripper jaws 20 mounted thereon moves about a predetermined path of travel which is defined by idler sprockets 22, 24, 26, 28, 30, and by driven sprockets 32 (only one of which is shown in FIG. 1) mounted on a shaft 36. Power is supplied to the driven sprocket 32 by the parent machine 12 through an arrangement of sprockets and chain 38 and a sprocket 34 mounted on the shaft 36. A cam 40 extends from near the sprockets 28 and 30 around the path of travel to the feeding station.

A vacuum tube 42 is located beneath the machine and near the sprocket 26. Above the vacuum tube 42 and in the path of travel of the endless conveyor 18 are nylon chain supports 44 (only one of which is shown in FIG. 1) which form an inclined portion 46 in the path of travel. A "stacking station" is thereby defined and extends from the vacuum bar 42 and wedges 44 to the sprocket members 28 and 30.

Also making up the stacking station and lying below the path of travel 46 of the conveyor is an indexing turret generally indicated at 50. Stacking or pin supports 48 are carried and positioned by the turret for receiving the bags. A supply track 52 is partially shown in FIG. 1 and functions to supply empty pin supports to the turret. A similar track 54 (see FIGS. 12 and 13) removes filled supports. It should be noted that most of our discussion will concern one bag moving through the machine. In actual practice, two bags are fed to and move through the machine side by side (see FIG. 2). For this reason two completely separate sets of stacking units (turrets, tracks, etc.) are necessary, one on each side of the machine.

Discussing now the apparatus in greater detail, and considering also FIG. 2, bags 11 are fed from the bag producing machine 12 onto the endless conveyor 54, which is powered by the variable speed motor 55 through the sprocket and chain arrangement 56. The use of the variable speed motor allows control of material having different characteristics. The conveyor 54 moves in the direction of the arrows. Small cotton belts 58 are spaced over the horizontal portion of the path of travel of the belt 54 and angle toward the belt 54 at the feeding station, as can be seen in FIG. 1. Air nozzles 60 are also positioned at the feeding station and are directed toward the belt 54.

As will be understood by one skilled in the art, as the bags 11 are fed from the machine 12, they are carried by the belt 54 toward the bag stacking machine. With light flexible material such as polyethylene bags, the tendency is for the leading edge to blow up or fold back, thereby preventing proper feeding to the gripper jaws 20. The combined action of the belt 58, also moving in the direction of the arrow, and of the nozzles 60 prevents the leading edge of the bags from curling over and maintains them flat against the belt 54.

As can be seen in FIG. 2, two bags 11 are produced simultaneously thus requiring two conveyors 54. These bags are fed to the bag stacking machine with their leading edge being a longitudinal one. At this point, the bags are properly positioned at the pick-up station for being received by the gripper jaws 20. Accordingly, we will now turn our discussion to the gripper jaws and refer primarily to FIGS. 2, 3, and 4.

Each gripper jaw is made up of an elongated housing 62 which extends across the width of the machine 10. This housing may be comprised of sheet metal and is generally U-shaped. As viewed in FIG. 3, the lower leg of the housing 62 has an offset portion 64 which acts as one of the gripping jaws.

The second coacting jaw is a plurality of elements 66 which are spaced across the length of the housing 62. These elements 66 are separated from each other by dividers 68 and are somewhat loosely attached to, for rotation with, shaft 70. An element 72 is located in the outermost end of the gripper jaw 66 and may be made of a material such as rubber to produce a tighter grip. Due to their somewhat loose connection to shaft 70, each jaw has a certain amount of play. End or support blocks 74 are located at both ends of each gripper jaw and provide a means of attachment to chains 76 which make up the endless conveyor. Pins 77 are inserted in the openings 79 in the blocks 74 for attachment of the blocks to the chains. Suitable means are used to secure the pins.

As is best seen in FIG. 2, these endless chains are spaced on both sides of the bag stacking machine. Each shaft 70 is rotatably mounted in the blocks 74 and are fixedly attached to cam followers 76 which extend from a slot 78 in the blocks 74. Contact by the cam followers against the cam 40 act to rotate the shaft, and attached jaw members 66, thus opening the jaws. Torsion springs 80 are attached to each jaw element 66 and to the housing 62 to provide a constant bias urging the jaws 66 against the jaws 64.

Returning now to FIG. 1, the cam 40 which actuates the jaws contacts the cam followers 76 near the sprocket 30. At this point, the gripper jaws are opened by the cam action. Since the cam 40 extends adjacent the path of travel from the sprocket 30 to a point opposite the sprocket 22, the jaws remain open during this entire portion of its travel. Accordingly, as the jaws approach the pick-up station they are open and the leading edge of the bag 11 fed by the belts 54 and 58 will be received. In FIG. 1, the gripper jaw 20 in the pick-up station has just left the cam 40 and its jaws have closed upon an edge of a bag 11. Since the jaws extend the width of the machine, they are sufficient to grip both bags fed through the parent machine 12.

The path of travel of the conveyor 18 at this pickup station is partially comprised of an arc defined by a portion of the periphery of the sprocket 22, with the concave side of this arc facing the belt 54. As is also shown in FIG. 1, the actual gripping portions of the jaws are laterally offset from the conveyor 18. Accordingly, if the gripping portion extends outwardly from the path of travel a distance equal to the radius of the sprocket 22, which is also, of course, the radius of the arc defined by the sprocket 22, the gripping portion would remain stationary at the pick-up station while the portion of the conveyor 18 to which the gripper jaw is attached moves through this arc. This principle is disclosed generally in Chironis, Mechanisms, Linkages and Mechanical Controls, 40 (1965) and in the patent to Fievet, No. 3,256,970, issued June 21, 1966.

In the embodiment disclosed here, however, the gripping portions are spaced from the conveyer a distance which is greater than the radius of the sprocket 22. Accordingly, the gripping portions will, in effect, back up as the conveyer moves forward. This will provide even more time within which the leading edge of the bag 11 may be inserted into the gripper jaws. After the bag is gripped at the pick-up station, it moves upwardly and around the sprocket 24 and then around sprocket 26 and over the wedges 44. At this point, it enters the stacking station.

Discussing now the stacking station and considering FIGS. 5 and 6, as the endless chains 76 move over the wedges 44, they enter the downwardly inclined portion 46 of their path of travel. Since the gripping jaws 20 grip only one edge of the bags 11, the remainder of the bags hang down and are pulled across the vacuum bar 42. The vacuum pulled on the bags 11 and cause the bags to be maintained in a taut manner as the gripping jaw continues to move to and about sprocket 28. Since the gripping jaw is moving downwardly as it approaches the sprocket 28, the tautly held bag 11 is, in effect, dragged over the upstanding pins 49. As is seen in FIGS. 5 and 6, openings 82 are located in the bags to provide means for the reception of the pins 49. FIG. 5 also shows the bag 11 being drug over the pins, the upper ends of the pins pushing the material of the bag up as shown.

As at the pick-up station, an arc is defined in the conveyer's path of travel at the release station. This arc is defined by the sprocket 28 and the concave portion of the arc directed toward the release station. The radius of sprocket 28 is, however, greater than the distance between the gripping portion of the jaws and the path of travel of the conveyer. Accordingly, the gripping portion will rotate about a smaller arc than the arc defined by the periphery of sprocket 28. As a result of movement through the smaller arc, the gripping portions will move at a considerably slower speed than the speed of the conveyor chains. This smaller arc also results in the movement of the gripping portion of the jaws and of the gripped portion of the bag slightly downwardly at the proper moment to insure that the pins 49 are snagged by the openings 82. At this point, the cam follower 76 contacts the cam 40 opening the jaws and releasing the bag. By actuating mechanism to be described, the fingers 90 are moved upwardly from their position shown in FIG. 5 and inwardly over the upstanding pins 49. They then move downwardly, forcing the bags 11 securely onto the pins 49. The fingers are then returned to the position shown in FIG. 5.

As can be seen from the above description, the use of the arcs adjacent the pick-up and stacking stations provide a means for slowing the speed of the gripper jaws while maintaining the speed of the conveyor constant. This gives additional time to perform the pick-up and release steps. In the case of the pick-up station, the jaws actually back up, whereby even more time is provided.

At the release or stacking station, the small arc through which the gripping portion of the jaws rotate not only slows the speed of travel but provides a snagging effect with the holes 82 and pins 49. The combination of this and the other elements found at the stacking station bring about an effective and reliable placement of the bags 11 over the upstanding stacking pins or guides. The vacuum bar causes the bags to trail out in a taut manner as they are moved forward by the conveyor. The downwardly inclined portion 46 of the conveyor's path of travel and the arc at the sprocket 28 cause at least a portion of the bags to slide over the points of the stacking pins (see FIG. 5) to snag the openings 82, just prior to contact with the cam 40 by the cam follower 76. As a result, accurate and dependable stacking of flexible sheet material is achieved with the additional result of increased speed of operation. As will be readily understood from viewing FIG. 2, of course, a pick-up and a stacking station are located on each side of the bag stacking machine 10.

Turning now to the reciprocating fingers 90 and considering FIG. 7 the apparatus used to move the fingers in the desired manner will now be discussed. It should be noted that the fingers and the actuating mechanism are not shown in FIG. 1 or 2 in order to illustrate more clearly the positioning of the indexing turret 50.

The fingers 90 are adjustably connected to a cross bar 92. Two rods 94 are fixedly attached to the cross bar 92 and extend through the block 96 for sliding motion relative to this block.

Appropriate linkage means connect the rods 94 to the generally L-shaped lever 98 which pivots about the shaft 100 and which is partially shown by broken lines for clarity of illustration of the remainder of the apparatus. Lever 98 is connected to one end of a second lever 102 which is rotatable about a shaft 104 and which carries the cam follower 106 on its other end. This cam follower contacts the cam 108 which is mounted on the driven shaft 36 of the bag stacking machine 10. The two levers 98 and 102 lie in planes generally perpendicular to each other.

The block 96 is supported and moved by the link 110 which is fixedly attached to the underside of the block 96. Link 110 is rotatably connected to one end of the lever 112 which is also rotatable about the shaft 104 and which also carries a cam follower 114. This cam follower coacts with the cam 116 which is also mounted on the shaft 36. The entire arrangement is supported by the frame 118 which is only partially shown and which is attached to the machine support frame 14. The shafts 100 and 104 are, of course, fixedly secured to either the frame 118 or 14.

As will be understood by an examination of FIGS. 1–7 while the pin support 48 that receives the bags is positioned beneath, but on the edge of the path of travel of the endless conveyor, the fingers and their actuating mechanism are positioned to the side of the machine, only the fingers moving under the path of travel. There is, of course, a set of fingers and actuating means on each side of the machine for each of the stacking stations.

As stated earlier, to achieve their desired result, the fingers 90 must move in over the upstanding pins 49 and then down to press the bags onto the pin support, and finally, back out and up to repeat the cycle. To achieve this motion, the fingers must have both an up and down and an in and out motion.

The up and down component of the fingers' motion is achieved by the movement of lever 112 about its shaft 104 as a result of the action of cam 116. As will be easily understood, the up and down rocking of the end of lever 112 that is attached to link 110 will result in the block 96, and in turn, the fingers 90, moving up and down. Accordingly, by a proper selection of the cams 108 and 116, the desired motion for the fingers 90 is achieved. The cam 116 should be so designed that the downward movement of the fingers 90 results, not from a positive action by the cam, but simply from the weight of the mechanism. Accordingly, a dwell should be appropriately placed in cam 116. This will compensate for the variation in height of the bags as they are stacked on the pin support.

One of the most important features of the present invention is the method and apparatus disclosed for properly placing the indexing supports at the work station and for removing the filled supports and supplying empty ones. This is accomplished by the use of the indexing turret 50 and associated trades.

Discussing now the indexing turret 50 and referring primarily to FIG. 11, the turret is comprised of two sets of arms 120 and 122. As seen in FIG. 1, the arms 120 are located on one end of the turret and the arms 122 on the other end of the turret. The arms 120 rotate about the shaft 124 and the arms 122 about shaft 126, which is partally hidden in FIG. 11 by an arm from the set 120. Rectangular pin support holders 128 are connected at digonal corners to one arm from each of the sets 120 and 122 for rotation in dependently of their respective supporting arms. As can be seen in FIG. 11, this arrangement allows the holders 128 to be always in an upright position as the arms rotate about their respective shafts.

The arms 120 and 122 rotate to four positions which are indicated in FIG. 11 by the letters A, B, C, and D. The position A is the position in which empty pin supports 48 are fed to the turret. Position B is the position in which the bags 11 are received from the bag stacking machine 10. Position C is the position in which filled pin support holders are removed from the turret, and position D is simply an idle or unused position. As viewed in FIG. 11, therefore, the sets of arms 120 and 122 rotate about their axes in a counterclockwise position. The indexing turret on the opposite side of the machine is, of course, arranged in just the reverse order of that shown in FIG. 11. As will be understood, this turret could utilize only three pairs of arms, and accordingly, three positions, due to the fact that position D is not essential. This would result, however, in an increased amount of time necessary to rotate pin supports into, and out of, the stacking position B.

To achieve this intermittent rotation to the four positions shown in FIG. 11, the apparatus shown in FIG. 10 is utilized. Although this apparatus is shown mounted on the shaft 124, it may, of course, be mounted on either shaft. This actuating mechanism uses a star wheel 130 having notches 132 in each of its teeth which are positioned 90 degrees apart. The star wheel is fixedly attached to the shaft 124, whereby as it rotates, the shaft will also rotate. A bushing 134 is located on both sides of the star wheel, the bushing on the near side as viewed in FIG. 10 being removed for purposes of illustration.

Located adjacent the star wheel 130 is an actuating plate 136. Rotatable about a pin 138 in the plate 136 is is a pawl 140. A lug 142 is located on one end of the pawl 140 and on the opposite end is an upstanding flange 144. A spring 146 carried by the plate 136 acts against the pawl 140 to urge the lug 142 out of engagement with the notches 132. A cylinder rod 150 is attached to the plate 136 at the bolt hole 148. The cylinder for this rod 150 is not shown but is of a conventional type and provides reciprocating motion to the rod. The cylinder must, of course, be rotatably mounted due to the fact that movement of the rod 150 to urge the plate 136 about the shaft 124 will be in an arc, the center of which is the shaft 124. Also carried by the plate 136 is an internally contained piston 152 shown in broken lines in FIG. 10. Carried on the piston is a rod 154. Hylraulic fluid is supplied to the piston chamber through the line 156.

In operation, the lug 142 is normally out of engagement with the groove 132 due to the action of the spring 146. When it is sought to rotate the turret 90 degrees, hydraulic fluid is forced into the chamber of piston 152, whereby the rod 154 is forced against the flange 144. This causes the lever 140 to rotate about its pivot point 138, thereby engaging the lug 142 in a slot 132. The pressure applied to the piston 152 must, of course, be sufficient to overcome the force of the spring 146. The cylinder rod 150 is then moved up a distance sufficient to rotate the star wheel 90 degrees in a counterclockwise direction, as viewed in FIG. 10. This amount of rotation will move each of the holders 128 one position. The pressure is then released from the piston 152 and the spring 146 will force the lug 142 from the slot 132. The cylinder rod 150 is retracted downwardly the same distance, whereby the plate 136 and attached pawl 140 is positioned adjacent the next subsequent tooth on the star wheel.

It should be noted that rotation is imparted to only one shaft of the turret. As the one shaft turns, the other will also due to the means interconnecting the two. Because of the high speed and precision required of the operation, however, this is generally unsatisfactory. Motion is generally transmitted to the other shaft, therefore, by extending the shafts toward each other until a portion of each are side-by-side. These adjacent portions are then connected by a chain or belt or by appropriate intermediate gears.

Turning now to the supplying of the pin support holders 48 to the indexing turret and referring to FIGS. 8 and 9, an inclined track, generally indicated at 52, is used to supply by gravity the pin support holders 48 to a tilting table 160. As will be readily understood by one skilled in the conveyor art, the track 52 is comprised generally of two parallel plates 156 and 158 with rollers 159 extending therebetween. The table 160 is also comprised of two plates, only one, 161, of which is shown in FIGS. 8 and 9 due to the section taken through the table. The two plates forming the table are located one adjacent each of the plates 156 and 158. The table 160 rotates about a shaft 162 and has stops 164 and 166 on the plates 156 and 158 at opposite ends of the table to limit its rotation. Located on the pivot shaft 162 of the table 160 is a depending lug 176. This lug 176 is rotatable about the shaft 162 but is attached by means of a spring 178 to the table. Still another stop 167 is located below the tilting table 160 on the inclined track. Also below the table 160 and extending between the plates 156 and 158 are three smaller rollers 180. A cylinder 168 is positioned between the plates 156 and 158 and carries on the outermost end of its piston rod a ram 170. Tracks 172 are located on each of the plates 156 and 158, and the ram 170 carries wheels 174, whereby it runs in the tracks 172.

In operation, pin supports 48 which are placed on the rollers 159 of the inclined track 52 roll by gravity to the position adjacent the titlting table. The pin support holder that is presently on the tilting table will prevent further movement as shown in FIG. 8. The pin support holder on the table is prevented from moving off of the table due to the stop 167, also shown in FIG. 8. Since the center of gravity of the table is to the left, as viewed in FIGS. 8 and 9, of its axes 162, the table will normally assume the position shown in FIG. 8.

A pin support 48 has been previously placed on the rollers 180 in the manner to be explained below. To move this pin support from the rollers 180 and onto the holder 128 located in position A, the cylinder 168 is acuated and the ram 170 moves forward, pushing the pin support holder onto the indexing turret as shown in FIG. 8. A rear plate 182 is located on the side of the turret opposite the feed track and properly positions the pin supports 48. This plate 182 is semi-circular so that the pin supports contact it in each of the positions A, B, and C.

Each pin support 48 has a groove 184 in both of its sides. The holders 128 have mating flanges 129 extending inwardly (see FIG. 11). As the support holders 48 are shoved forward by the ram 170, the grooves 184 are received by the inwardly extending flanges 129 to further properly align and position the pin supports.

After the fresh pin support is properly positioned in the turret, the ram 170 is returned to the position shown in FIG. 9. In doing this, the rear of the ram contacts the depending lug 176 rotating it about the axes 162 in a clockwise direction. This causes the spring 178 to exert a downwardly directed force on the lowermost end of the tilting table 160, which allows the pin support 48 located on the table to clear the stop 167 and move by gravity onto the rollers 180 to assume the position of the pin support holder shown in dotted lines in FIG. 9. While in the position shown in FIG. 9, the rearmost edge 163 of the table 160 will act as a stop, thus preventing the movement of an additional pin support onto the table. When the ram subsequently moves forward to shove the pin support on the rollers 180 onto the turret, the depending lug 176 will be released and the table will be allowed to return to its normal position shown in FIG. 8. This will lower the edge 163 and allow the next support to move onto the tilting table.

Referring now to FIGS. 8, 12 and 13, a cylinder 188 is positioned adjacent the B position of the indexing turret and on the side opposite the plate 182. At the outermost end of its cylinder rod, a plate 190 is located. This cylinder and plate 190 serve the function of insuring the proper positioning of the indexing supports 48 when in the stacking position B. When an empty support is indexed from position A to position B, the cylinder 188 moves the plate 190 forward, thereby insuring that the support holder in position B is against plate 182. In this manner, exact positioning of the pin supports during the operation is achieved.

Returning now to the operation of the turret, after a predetermined member of bags have been placed on the pin support in the stacking or B position, the turret is rotated to place a fresh or empty support in the stacking position and to move the filled support to the position C for removal. The apparatus used to remove the filled supports is shown in FIGS. 12–14.

This removal apparatus is comprised generally of a horizontal track 54 which is made up of a first track 192 and a second 194, and which is positioned adjacent the indexing turret's position C. As can be seen in FIG. 14, the track 194 is at the lower corner on the edge of the supports over which the bags drape. The track 194 is at the diagonally opposed corner. Due to the weight of the bags, the support will tend to rotate in a counterclockwise direction (as viewed in FIG. 14), and accordingly, only the two tracks shown are necessary.

A cylinder 196 is located beneath the track and has a ram 198 at the outermost end of its piston rod which moves along a track 199. A tooth or lug is located on the frontmost end of this ram 198 for engagement with a slot 202 which is located in the bottom of each pin support 48. The lug 200 is rotatable about a pivot point 204 and is normally urged into an upright position by the actions of a spring 208. The abutting shoulders 206 prevent rotation of the tooth in a counterclockwise direction (as viewed in FIG. 15) beyond this upright position.

As the cylinder 196 extends its piston rod and ram 198, the upstanding lug 200 contacts the edge of the support 48 and is rotated about its pivot point 204 so that it will pass under the support 48. The action of the inwardly extending flanges 129 and of the grooves 184 will prevent the pin support from riding up due to the action of the upstanding lug 200. When the lug reaches the slot 202, however, the spring urges it into its upright position as shown in FIG. 15. The cylinder 196 then retracts the ram 198, pulling with it the pin support 48 onto the track 54. The filled supports are then removed by hand or relayed to another conveyor.

As can be seen, therefore, the present invention provides improved method and means for stacking sheet material, particularly flexible sheet material such as plastic bags. The disclosed invention provides a reliable method of picking up and stacking the bags while utilizing a continuously moving conveyor. A combination of elements at the stacking station provide an extremely reliable stacking means and method. Furthermore, improved means and methods have been disclosed to quickly and simply index pin supports to and from the stacking station without interruption of the operation and to accurately position these for stacking purposes. Further means have been disclosed for supplying empty pin supports to the indexing means and removing filled supports.

What is claimed is:

1. A machine for picking up and stacking sheet material including:
   a continuously moving endless conveyor means having a defined path of travel,
   a pick-up station and a releasing station in said path of travel,
   at least one gripper jaw attached to said conveyor means, said jaw being normally closed,
   means for opening said jaw at both of said stations for the pick-up and release of said material,
   vacuum means adjacent the releasing station in the path of travel for stretching the sheet material as it passes over the vacuum means,
   support means for receiving the material as it is being released at the releasing station, and
   means to slow the speed of travel of said jaws at said stations,
   said means for slowing the speed of travel being an arc formed in the path of travel at each of said stations, each of said arcs being defined by a sprocket about a portion of which the conveyor means moves.

2. The invention of claim 1 wherein
   the radius of the sprocket at the pick-up station is less than the lateral distance from the conveyor means to the gripper jaws, and
   the radius of the sprocket at the releasing station is greater than said distance.

3. A machine for picking up and stacking sheet material including,
   a continuously moving endless conveyor means having a defined path of travel,
   a pick-up station and a releasing station in said path of travel,
   at least one gripper jaw attached to said conveyor means, said jaw being normally closed,
   means for opening said jaw at both of said stations for the pick-up and release of said material,
   vacuum means adjacent the releasing station in the path of travel for stretching the sheet material along the axis of travel as it passes over the vacuum means,
   support means for receiving the stretched material as it is being released at the releasing station, and
   the gripper jaws being spaced laterally outwardly from the conveyor means, including means to slow the speed of travel of said jaws at said stations.

4. A machine for picking up and stacking sheet material including,
   a continuously moving endless conveyor means having a defined path of travel,
   a pick-up station and a releasing station in said path of travel, at least one gripper jaw attached to said conveyor means, said jaw being normally closed, means for opening said jaw at both of said stations for the pick-up and release of said material, vacuum means adjacent the releasing station in the path of travel for stretching the sheet material as it passes over the vacuum means, and support means for receiving the material as it is being released at the releasing station, the gripper jaws being laterally attached to the chain and said means for slowing the speed of the jaws at the releasing station is comprised of, a first arc adjacent said station, the concave side of the arc facing the station and having a radius larger than the distance between the gripper jaws and the chain, whereby the jaws are moved about a second arc which has a radius smaller than the radius of the first arc and thus at a speed slower than the rate of travel of the chain.

5. The invention of claim 4 wherein, the jaws enter the releasing station from one side and exit from a second side, said first arc being located adjacent the stacking station on said second side, and said vacuum means is located on said first side of the releasing station.

6. The invention of claim 5 wherein, the sheet material has spaced holes therein, and further including, stacking guides positioned beneath the path of travel at the releasing station to be received by said holes.

7. The invention of claim 6 wherein, the path of travel is defined as having, a downwardly inclined portion extending from said vacuum means to said first arc.

8. The invention of claim 7 and including, finger means for pressing the sheet material down onto the guides.

References Cited

UNITED STATES PATENTS

| | | | |
|---|---|---|---|
| 319,460 | 6/1885 | Cottrell | 271—79 |
| 1,156,903 | 10/1915 | Henderson | 271—79 |
| 1,537,594 | 5/1925 | Elsworth | 271—79 |
| 2,106,199 | 1/1938 | Wormser | 271—79 |

EDWARD A. SROKA, Primary Examiner

U.S. Cl. X.R.

271—79